US010894214B2

(12) United States Patent
Holtz et al.

(10) Patent No.: US 10,894,214 B2
(45) Date of Patent: Jan. 19, 2021

(54) FACILITATING MULTIGAME CURRENCIES IN MULTIPLE ONLINE GAMES

(71) Applicant: Electronic Arts Inc., Redwood City, CA (US)

(72) Inventors: Brian Holtz, Los Altos Hills, CA (US); Deniz Ipek, Mountain View, CA (US); Dale Cook, San Francisco, CA (US); Miikka Skaffari, San Francisco, CA (US); Katherine Wiemelt, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 15/863,061

(22) Filed: Jan. 5, 2018

(65) Prior Publication Data
US 2018/0126280 A1  May 10, 2018

Related U.S. Application Data

(63) Continuation of application No. 14/527,809, filed on Oct. 30, 2014, now Pat. No. 9,895,613.

(51) Int. Cl.
| A63F 13/69  | (2014.01) |
| A63F 13/79  | (2014.01) |
| A63F 13/792 | (2014.01) |
| A63F 13/73  | (2014.01) |
| A63F 13/46  | (2014.01) |

(52) U.S. Cl.
CPC ............ *A63F 13/792* (2014.09); *A63F 13/73* (2014.09); *A63F 13/79* (2014.09); *A63F 13/46* (2014.09); *A63F 13/69* (2014.09)

(58) Field of Classification Search
None
See application file for complete search history.

(56) References Cited

U.S. PATENT DOCUMENTS

| 8,296,834 | B2 | 10/2012 | Ritari |
| 8,364,970 | B2 | 1/2013 | Fu |
| 8,622,828 | B1 | 1/2014 | Harrington |
| 8,663,004 | B1 | 3/2014 | Xu |
| 2006/0121991 | A1 | 6/2006 | Borinik |
| 2012/0066753 | A1 | 3/2012 | Pan |

(Continued)

*Primary Examiner* — Damon J Pierce
(74) *Attorney, Agent, or Firm* — Knobbe, Martens, Olson & Bear, LLP

(57) ABSTRACT

A system and method for facilitating multigame currencies in multiple online games and security therewith is disclosed. The multigame currencies may be "spent" and/or "earned" by the players in the individual ones of the multiple online games. A request to use the multigame currencies in a given player account in a given online game may be authenticated through a third party identity that has been associated with the given player for the given online game. In situations where such an association does not exist, a third party identity associated with the given player for any other online game may be used to authenticate the request. In situations where no third party identity is associated with the given player for any one of the online games, an association of a third party identity and the given player for the given online game may be facilitated for subsequent authentication of requests.

14 Claims, 7 Drawing Sheets

(56) References Cited

U.S. PATENT DOCUMENTS

| | | | |
|---|---|---|---|
| 2012/0244950 A1* | 9/2012 | Braun | G07F 17/3244 463/42 |
| 2013/0123018 A1* | 5/2013 | Sareli | G07F 17/3223 463/42 |
| 2014/0067691 A1 | 3/2014 | Pitroda | |

* cited by examiner

FACILITATING MULTIGAME CURRENCIES IN MULTIPLE ONLINE GAMES

FIELD OF THE DISCLOSURE

This disclosure relates to facilitating player participation in online games and security therein.

BACKGROUND

Facilitating player participation in online games through virtual currencies is generally known. In conventional game systems, currencies are typically provided in an online game to enable the players to acquire virtual items, participate in events, perform speedup activities, complete in-game tasks and/or engage in any other activities in the online game.

Authentication through a third party identity in a system is generally known. In such a system, a user may be authenticated through a third party identity such as Facebook™, Google+™, Amazon, and/or any other third party identities associated with the user.

SUMMARY

One aspect of the disclosure relates to facilitating a multigame currency mechanism across multiple online games. A player account associated with a given player may be managed. The player account may comprise currency information indicating a balance of multigame currencies available for the given player to use across the multiple online games. Various types of player progress in a given one of the online games may enable the player to "earn", "purchase" or otherwise acquire the multigame currencies. For example, a player's actions in the given online game may "earn" multigame currencies for the player in the given game. As another example, a given player may be enabled to "purchase" the multigame currencies using real world money. The player progress may include certain amount of play time played by the given player in the given online game within a time period, certain milestones, gameplay status, social status reached by the player in the given online game, certain number of play sessions logged by the given player in the given online game during a time period, certain events completed by the given player in the given online game and/or any other progress by the given player in the given online game. The balance of the multigame currencies in the player account may be updated based on the progress achieved by the given player in the individual ones of the online games. This may improve player interaction with the online games. This may enhance monetization opportunities for the provider of the online games as the players may be motivated to play the online games to "earn" multigame currencies.

Another aspect of the disclosure relates to facilitating security for players to use the multigame currencies in the multiple online games. A request to use, in a given one of the multiple online games, the multigame currencies in a given player account may be authenticated using a third party identity associated with the given player for the given online game. In situations where the given player has not been associated with a third party identity for the given online game, the request may be authenticated through an existing third party identity associated with the given player for another one of the online games. Subsequent to a successful authentication using the existing third party identity associated with the given player for another game in these situations, the given player may be facilitated to associate a third party identity with him/herself for the given online game for future authentication of requests to use multigame currencies in the given player account in the given online game. In this way, multigame currencies in a player account may be protected through a third party identity in an online game and thus prevent unauthorized use of the multigame currencies.

In one embodiment, in accordance with the disclosure, a given player may be enabled to "earn" multigame currencies, or loyalty points, in multiple online games through player actions in those games. In that embodiment, the multigame currencies earned by the given player may be spent by the given player in any one of the multiple online games. For example, the given player may "earn" the multigame currencies in a first online game and spend the multigame currencies in a second online game and/or in a third online game. Still in that embodiment, the given player's requests to spend multigame currencies in a given one of the multiple online games may be authenticated via a third party identity (e.g., such as FB, Google+, or any other third party identity) associated with the given player. Such a third party identity may be established by the given player at the very first time when the given player requests to spend the multigame currencies in any one of the multiple online games. The third party identity may be associated with the players in the multiple online games for authenticating requests to use multigame currencies.

In another embodiment, in accordance with the disclosure, a given player may be enabled to "purchase" the multigame currencies from any given one of the multiple online games. For example, without limitation, the given player may be enabled to purchase a quantity of multigame currencies with a corresponding amount of real world money, credits, points, and/or any other stored consideration.

In some examples, player accounts may be merged when an third party identity for authenticating multigame currencies are identified by two players. For example, a player #1 may provide a third party identity, e.g., a Facebook identity, for using multigame currencies that he has earned. In that example, if the Facebook identity provided by the player #1 has already been used by player #2 for using multigame currencies that player #2 earned, the player accounts of player #1 and #2 may be merged.

In some examples, a given player may be requested to authenticate him/her-self through the third party identity when the given player disassociates him/her-self with that third party identity. For example, the given player may be enabled to remove a third party identity, e.g., Facebook identity that has been associated with the given player. In that example, the given player may be challenged to authenticate him/her-self when the given player disassociates that Facebook identity with the him/her-self.

A system configured to facilitate multigame currencies across multiple games may include one or more servers. The servers may operate in a client/server architecture with one or more client computing platforms. The client computing platforms may be associated with the players of the game space. The servers may be configured to execute one or more of: a first game component, a second game component, a player account component, a game communication component, a first game level component, a second game level component, a currency information update component, a first request component, a second request component, a first authentication component, a second authentication component, and/or other components.

The first game component may be configured to execute and implement an instance of a first online game. The first online game may be associated with a first game space in which gameplays may be facilitated for players of the first online game. Within the first game space, players may control one or more of an element in the first game space. The players may input commands with specific parameters to undertake specific deeds, maneuvers, actions, functions, spheres of actions and/or any other types of interactions within the first game space. Within the first game space, the players may use multigame currencies to perform various game activities.

The second game component may be configured to execute and implement an instance of a second online game. The second game component may be configured with functionalities similar to those described above for the first game component. A second game space may be associated with the second online game. The second game space may facilitate gameplays similar to or different from those provided in the first game space. The second online game may be separate and discrete from the first online game such that players of the first online game may not interact with the second game space from the first online game. Players that participate in both the first game space and the second game space may control different characters in the respective games (e.g., characters from the first online game may not be present in the second online game, and vice versa), may be associated with different realms they are building in the different games (e.g., realms present in the first online game may not be present in the second online game, and vice versa), may have separate player inventories of virtual items that are not transferable between the first and second online games, may be members of separate alliances in the different games, and/or may be separate and discrete in other ways. Progress and/or gameplay by a player in the first online game may or may not impact on progress and/or gameplay by the player in the second online game. The first online game and the second online game may be associated with different internet locations (e.g., URLs or IP Addresses), may have different game genres, may require access through different platforms (e.g., one online game may be a mobile game and the other may be accessed through a social network; other examples are contemplated). However, within the first and second online games, multigame currencies may be used to facilitate player participation.

The player account component may be configured to manage player accounts for the individual players of the first and second online games. The player accounts managed by the player component may include player information and/or player profiles. The player and/or the player profiles may include player identifying information, demographic information, time zone, and/or any other types of profile information related to the individual players. The player identifying information may include information indicating a third party identity associated with the player for a given online game. For example, for given player, the player identifying information may include information indicating a first social media (e.g., Facebook) identity is associated with the given player for the first online game, and information indicating a second social media (e.g., Google+) identity is associated with the given player for the second online game. The player accounts may comprise currency information indicating a balance of the multigame currencies available for the players to use across the first online game, the second online game and other online games (if any).

The first game level component may be configured to manage player game level accounts for the players of the first online game. The player game level accounts managed by the first game level component may comprise progress information indicating player progress in the first online game. The progress information may include certain amount of play time played by the player in the first online game within a time period, certain milestones, gameplay status, social status reached by the player in the first online game, certain number of play sessions logged by the player in the first online game during a time period, certain events completed by the player in the first online game and/or any other progress by the player in the first online game.

The second game level component may be configured to manage player game level accounts for the players of the second online game. The player game level accounts managed by the second game level component may comprise progress information indicating player progress in the second online game. The progress information may include certain amount of play time played by the player in the second online game within a time period, certain milestones, gameplay status, social status reached by the player in the second online game, certain number of play sessions logged by the player in the second online game during a time period, certain events completed by the player in the second online game and/or any other progress by the player in the second online game.

The game communication component may be configured to receive, obtain, and/or transmit information related to the first online game, the second online game, and other online games (if any) from and/or to the respective online games. The information received/or obtained by the game communication component may include progress information in the player game level accounts managed by the game level components, requests to use currencies in the respective online games, and/or any other information. The information transmitted to the online games by the game communication component may include information instructing the online games how to authenticate requests to use currencies in the online games and/or any other information.

The currency information update component may be configured to intermittently update currency information in the player accounts based on the progress information in the player game level accounts for the players. The intermittent updates of the currency information by the currency information update component may include increasing the multigame currencies in the player account based on certain progress made by the player in a given online game, decreasing the multigame currencies in the player accounts according to requests to use multigame currencies in the online games, and/or any other operations. The currency information update component may be configured to evaluate player progress for determining currency update value.

The first request component may be configured to receive requests from requesters to use multigame currencies in the player accounts in the first online game. A given request received by the first request component may specify a quantity of the multigame currencies requested to be used in the first online game, an identification of a player account from which the requested multigame currencies may be debited, and/or any other information.

The second request component may be configured to receive requests from requesters to use currencies in the player accounts in the second online game. A given request received by the second request component may specify a quantity of currencies requested to be used in the second online game, an identification of the player in whose account the requested currencies may be debited, and/or any other information.

The first authentication component may be configured to authenticate requests to use currencies in the first online game as received by the first request component. The authentication by the first authentication component may be through a third party system that provides identity authentication service. For a given player, a third party identity may be associated with the given player for a given online game by virtue of previous successful authentication of the given player through the third party identity. In situations where no third party identity has been associated with the player for the first online game, the request to use the currencies in the first online game may be authenticated through an existing third party identity that has been associated with the player for another online game. In those situations, after successful authentication through the third party identity associated with the player for another online game, the player may be facilitated to associate a third party identity with him/herself for the first online game for authentication of subsequent requests to use the multigame currencies in the player account in the first online game. In situations where no third party identity has been associated with the first player in any one of the online games, the player may be facilitated to associate a third party identity with the first online game for authentication of subsequent requests to use the multigame currencies in the player account in the first online game. In some implementations, the first authentication component may be configured to authenticate requests to remove third party identities associated with the players in the online games. In response to such a request, the first authentication component may be configured to authenticate the request through the third party identity to be removed.

In some examples, the first authentication component may be configured to effectuate merge of two player accounts managed by the player account component. In those examples, the first authentication component may be configured to determine multigame currency spending history associated with a particular third part identity of a give player, and determine if such history reflect another player account that has been "drawing" and/or acquiring (e.g., through "earning" or "purchasing") the multigame currency using that particular third party identity. In response to a determination that another player has been "drawing" and/or acquiring the multigame currency using that particular third party identity, the first or second authentication component may be configured to effectuate the merge of the two player accounts.

The second authentication component may be configured to authenticate requests to use currencies in the second online game as received by the second request component. The authentication by the second authentication component may be through a third party system that provides identity authentication service. For a given player, a third party identity may be associated with the given player for a given online game by virtue of previous successful authentication of the given player through the third party identity. In situations where no third party identity has been associated with the player for the second online game, the request to use the currencies in the second online game may be authenticated through an existing third party identity that has been associated with the player for another online game. In those situations, after successful authentication through the third party identity associated with the player for another online game, the player may be facilitated to associate a third party identity with him/herself for the second online game for authentication of subsequent requests to use the multigame currencies in the player account in the second online game. In situations where no third party identity has been associated with the second player in any one of the online games, the player may be facilitated to associate a third party identity with the second online game for authentication of subsequent requests to use the multigame currencies in the player account in the second online game. In some implementations, the second authentication component may be configured to authenticate requests to remove third party identities association with the players in the online games. In response to such a request, the second authentication component may be configured to authenticate the request through the third party identity to be removed.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like-reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
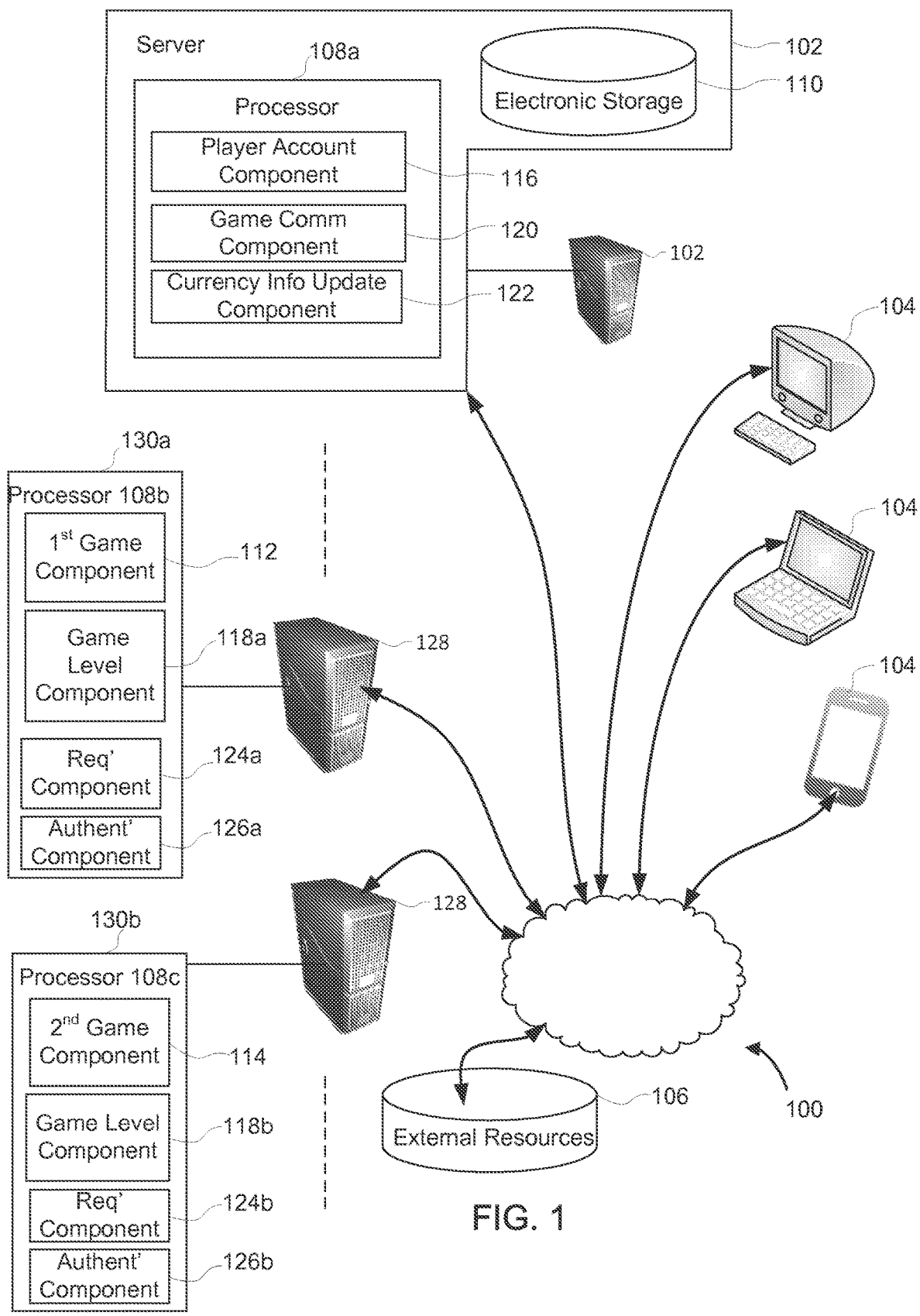
FIG. 1 illustrates a system for facilitating multigame currencies across multiple online games in accordance with one embodiment of the disclosure.

FIG. 1 illustrates a system 100 for facilitating multigame currencies across multiple online games. Providing the online games may include hosting the online games over a network. In some implementations, as shown in this example, system 100 may include one or more online game hosting servers 130 configured to host online games. It should be understood although two game hosting servers 130 are illustrated in this example, this is merely illustrative. The number of game hosting servers 130 that may be included in system 100 may vary from one example to another. Likewise, the number of online games that may be hosted in system 100 may vary from one example to another, and are not limited to only two online games as shown in this example.

Also shown in this example is that system 100 may include an online game management server 102 configured to manage online games hosted by servers 130. The servers 102 and 130 may be configured to communicate with one or more client computing platforms 104 according to a client/server architecture, and with each other. The players may access system 100 and/or the game spaces associated with the online games via client computing platforms 104. As shown, the servers 102 and 130 may comprise processors 108, configured to execute computer-readable instructions to implement system components. The system components may include one or more of a first game component 112, a second game component 114, a player account component 116, a first game level component 118a, a second game level component 118b, a game communication component 120, a currency information update component 122, a first request component 124a, a second request component 124b, a first authentication component 126a, a second authentication component 126b, and/or other components.

The first game component 112 may be configured to execute an instance of a first online game. Within the instance of the first online game, players of the first online game may interact with elements in the first online game and/or with each other through gameplays provided by the first online game. The gameplays may include role-playing, first-person shooter, real-time strategy, turn-based strategy, simulation, music or rhythm playing, social interaction, twitching, and/or any other gameplays. The execution of the instance of the first online game by first game component 112 may include determining a state associated with the first online game. The state may be communicated (e.g., via streaming visual data, via object/position data, and/or other state information) from server 102 to client computing platforms 104 for presentation to players. The state determined and transmitted to a given client computing platform 104 may correspond to a view for a player character being controlled by a player via the given client computing platform 104. The state determined and transmitted to a given client computing platform 104 may correspond to a location in a first game space associated with the first online game. The view described by the state for the given client computing platform may correspond, for example, to the location from which the view is taken, the location the view depicts and/or other locations, a zoom ratio, a dimensionality of objects, a point-of-view, and/or view parameters of the view. One or more of the view parameters may be selectable by the player.

The instance of the first online game may be persistent. That is, the first online game may continue on whether or not individual players are currently logged in and/or participating in the online game. A player that logs out of the first online game and then logs back in some time later may find the first game space associated with the first online game has been changed through the interactions of other players with the first game space during the time the player was logged out. These changes may include changes to the simulated physical space, changes in the player's inventory, changes in other players' inventories, changes experienced by non-player characters, and/or other changes.

The instance of the first online game may comprise a simulated game space, e.g., a first game space that is accessible by players via clients (e.g., client computing platforms 104) that presents the views of the first game space to a player. The first game space may have a topography, express ongoing real-time interaction by one or more players, and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the first online game may comprise game space entities automatically controlled in the instance of the first online game. Such game space entities may not be associated with any player. As such, the automatically controlled game space entities may be generated and/or developed by artificial intelligence configured with the server 130 by a provider, administrator, moderator, and/or any other entities related to the online game. These automatically controlled entities may evolve within the game space associated with the first online game free from player controls and may interact with the entities controlled by or associated with the players, other automatically controlled game space entities, as well as the topography of the first game space. Certain manifested traits may be associated with the automatically controlled entities in accordance with the artificial intelligence configured with the server 130. As used herein, such automatically controlled game space entities in the instance of the online game are referred to as "AI entities".

The above description of the manner in which state of the first game space associated with the first online game as determined by first game component 112 is not intended to be limiting. The first game component 112 may be configured to express the first game space in a more limited, or richer, manner. For example, views determined for the first game space representing the state of the instance of the first game space may be selected from a limited set of graphics depicting an event in a given place within the first game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

In some implementations, the first game component 112 may be configured to implement the first game space by determining the state of the first game space at a given time. This may involve implementing results of gameplays (e.g., encounters, quests, skill challenges, treasure collection, and/or any other gameplays) in the first game space. The state change of the first game space determined by the game space component 112 may include state change(s) of one or more AI characters in the game space. For example, a state change of a given player character may be determined by the first game component 112 based on a result of a combat encounter between the given player character and a monster during an encounter in the game space. The state change of the monster may include adjustments of the one or more attributes associated with the player monster. By way of non-limiting example, hit points, strength, stamina, and/or any other attributes associated with the monster may be adjusted (e.g., reduced) as the result of the combat encounter.

Within the instance of the first online game executed by first game component 112, the players may participate in the first online game by controlling one or more of an element in the first game space associated with the online game. The player-controlled elements may include avatars, game space characters, game space units (e.g., troops), objects (e.g., weapons, horses, vehicle, and so on), simulated physical phenomena (e.g., wind, rain, earthquakes, and/or other phenomena), and/or other player-controlled elements. The player-controlled avatars may represent the players in the first game space. The player characters may include heroes, knights, commanders, leaders, generals, and/or any other game space entities that may possess strength, skills, abilities, magic powers, knowledge, and/or any other individualized attributes. The game space units controlled by the player may include troops and/or any other game space entities that may be trained, recruited, captured, and/or otherwise acquired by the players in groups or en mass. The objects controlled by the players may include weapons, vehicles, projectiles, magic items, wardrobes, boots, armor, knapsacks, medicine, healing potions, and/or any other virtual items that may be employed by the players for interaction within the first online game.

In any case, the player-controlled elements may move through and interact with the first game space (e.g., AI entities, elements controlled by other players, and/or topography in the game space) associated with the first online game. The elements controlled by a given player may be created and/or customized by the given player. The given player may have an "inventory" of virtual goods and/or currency usable within the first game space.

Controls of virtual elements in the first game space may be exercised through commands input by a given player through client computing platforms 104. The given player may interact with other players through communications exchanged within the first game space. Such communications may include one or more of textual chat, instant messages, private messages, voice communications, and/or other communications. Communications may be received and entered by the players via their respective client computing platforms 104. Communications may be routed to and from the appropriate players through server 102 (e.g., through game component 112).

A given player may input commands with specific parameters to undertake specific deeds, actions, functions, sphere of actions, and/or any other types of interactions within the first game space. For example, the given player may input commands to construct, upgrade, and/or demolish virtual buildings; harvest and/or gather virtual resources; heal virtual player-controlled elements, AI entities, and/or elements controlled by other players; train, march, transport, reinforce, reassign, recruit, and/or arrange troops; attack, manage, create, demolish, and/or defend cities, realms, kingdoms, and/or any other game space locations controlled by or associated with the players; craft or transport virtual items; interact with or compete against or along with AI entities and/or game space elements controlled by other players in combats; research technologies and/or skills; mine and/or prospect for virtual resources; complete missions, quests, and/or campaigns; exercise magic power and/or cast spells; and/or perform any other specific deeds, actions, functions, or sphere of actions within the game space. In some examples, the given player may input commands to compete against elements in an environment within the game space—i.e., Player vs. Environment (PvE) activities. In some examples, the given player may input commands to compete against each other within the game space—i.e., Player vs. Player (PvP) activities.

The first game component 112 may be configured to execute player actions to facilitate interaction of the players with the first game space and/or each other in response to receiving game space commands input by the players. Execution of the player action by the first game component 112 may produce changes to the game state, which may reflect progresses and/or results of the player actions. In some examples, state changes caused by the execution of the player actions may be recorded in the electronic storage 110 to facilitate persistency throughout the instance of the first online game. In some examples, execution of the player actions may not produce persistent changes to the game state (e.g., a player character jumping forward and backward successively may not produce any perceivable game state changes to other players).

Within the instance of first game space executed by the first game component 112, player characters may encounter game space elements such as, without limitation, non-player characters including monsters, bosses, creatures, and/or any other non-player characters, objects, buildings, virtual items, virtual containers (e.g., mystery boxes), and/or any other game space elements. When player characters are exploring a specific area (such as a dungeon), moving through heavily patrolled territory (such as an armed camp or the border between unfriendly nations), or traveling through a heavily populated zone (such as a town), a monster or monsters associated with the area may appear and encounter the player character. For example, a given player character may encounter a group of monsters at a location within the first game space, e.g., in a dungeon. The encounter may result in one or more combative actions between the player characters and the group of monsters.

The player actions executed by the first game component 112 may include combat actions enabling players to direct player entities to compete against AI entities and/or against elements controlled by other players in combats. The combat actions may include real-time combat actions through which the players may direct player entities (e.g., avatars) to perform maneuvers in real or near-real time; may include turn-based combat actions through which the players may direct player entities (e.g., player character, troops, and/or combat equipment) to inflict damages and/or resist damages; may include strategy combat actions through which the players may position the player entities strategically in combats; and/or may include any other types of combat actions.

Within the first game space associated with the first online game hosted by the first game component 112, an entity such as a game space location, a building, a resource core, a character, troop, an animal, and/or any other type of entity may exist. An entity in the first game space may be associated with one or more data values—i.e., attributes. For example, a building in the first game space may be described by its level, type, production, cost, upkeep, and/or any other building attributes. A player character may be described by its strength, health, abilities, skills, level, maneuvers, magic power, and/or any other character attributes. Some attributes associated with an entity in the first game space may affect the gameplay in the first game space. For example, a production rate (e.g., converting a type of resources in the first game space to another virtual entity or item) associated with a building controlled by a player may affect the gameplay by the player in the online game; a movement rate (e.g., a number of tiles the troop may traverse in one turn) associated with a unit of troops controlled by the player may affect the gameplay by the player in the online game; and so on.

Within the first game space associated with the first online game, the players may control game space locations to generate revenues, productions, resources, troops, culture, wonders, special units, and/or any other types of output enabled by the game space locations controlled by the players. The player-controlled game space locations may include game space towns, cities, kingdoms, castles, villages, fortresses, landmasses, resource cores, and/or any other types of game space locations. Typically, through controlling such virtual locations, the players may grow populations, construct infrastructures, conduct commerce, collect taxes, raise troops, train special units, train knights, and/or any other player characters, research technologies, gain skills and/or abilities, and/or undertake any other actions, functions, deeds, or sphere of actions as enabled by such game space locations. For example, a given player may control multiple cities in the game space and the cities may generate revenues to fund the given player activities within the game space; may generate troops; may generate growth in science; may produce weapons; may generate production; may produce food; and so on.

The players may control resource cores in the first game space associated with the first online game hosted by the first game component 112. A resource core is a type of game space object that may provide specific raw materials, resources, currencies, substances, and/or any other game space elements when harvesting actions are performed by player characters with proper skills, equipment, gears, formulas, time duration, and/or any other harvesting parameters. Resource cores may or may not be visible to the players, depending on the players' skills. Resource cores may be depleted due to harvesting actions by players and in some examples may be destroyed in the game space associated with the online game. In some examples, new resource cores may be created to replace the destroyed ones in the game space at times determined by the provider, administrator, moderator, and/or any other entities related to the game space. Examples of resource cores may include mines, rivers, wells, oceans, swamps, mountains, forests, boxes, pets, plants, and/or any other game space locations or objects.

Within the instance of the first game space executed by the first game component 112, virtual currencies. The players may earn the virtual currencies, for example through gameplays provided in the game space (e.g., PvP activities, PvE activities, in-game tournaments, tasks, quests, missions, and/or any other gameplays in the game space). By way of non-limiting example, a given player may earn a predetermined amount of virtual currencies after completing an in-game task in the game space. In some examples, the provider of the game space may simply make certain amount of virtual currencies available, for instance through treasure troves in the game space such that the players may gratuitously collect the virtual currencies by exploring for the treasure troves. The players may acquire virtual currencies by receiving gifts from other players. One of ordinary skills in the art will appreciate that there are other ways for the players to acquire virtual currencies in the game space.

Within the first game space, the players may use virtual currencies in performing various game actions and/or activities. Certain game activities in the first game space may require players to use certain amount of virtual currencies, e.g., 100 diamonds for building a marketplace, 400 gold for recruiting a hero, 5 gems to be eligible to play a quest and other game actions or activities. These game activities or actions are commonly known as "sinks" for the players to use (consume) virtual currencies in the first online game. Other common "sinks" in the first online game may include speedup actions or items, virtual item purchasing (e.g., weapon, wardrobe, equipment, boosts, power ups, mounts, scrolls, and/or any other items), resources acquisition, and/or any other types of "sinks" in the first online game. As will be described below, in the first online game, multigame currencies may be used and/or earned by the players in one or more ways consistent with the description about virtual currencies.

Within the first game space associated with the first online game hosted by the first game component 112, player levels may be established to facilitate and/or incentivize player advancements. Players may receive virtual points for performing actions, participating in game space activities, interacting with game space elements and/or other players, and/or for engaging in any other interactions provided by the game space. A player may advance to a next level when a certain goal has been reached, an end condition has been fulfilled by the player in the online game, and/or the points acquired by the player have reached a threshold corresponding to the next level. Advancements in player levels typically result in attribute boosts, skill boosts, resistance boosts, higher status, and/or any other types of player progression in the game space. In some examples, for different categories of gameplays, skills, abilities, and/or any other areas that may be progressed by players, different levels may be established. For example, experience levels may be established in the online game to reflect overall experiences of the players, levels in certain skills may be established to reflect player progressions in acquiring or mastering these skills in the online game, and so on.

The second game component 114 may be configured to execute an instance of a second online game. The second game component 114 may be configured with functionalities similar to those described above for the first game component 112. A second game space may be associated with the second online game. The second game space may provide gameplays similar to or different from those provided by the first game space. As shown in this example, the second game component 114 may be hosted by a server 130 (or servers) different from that (or those) hosting the first online game. However, this is only illustrative. In some examples, first and second online games may be hosted by the same server 130.

In any case, the second game space may be separate and discrete from the first game space. For example, the first and second online games may involve separate client-side applications for invoking respective online games, separate game space interfaces, separate game states, separate game characters, separate game rules, separate game mechanics, separate game objectives, separate players, and/or any other separate properties that distinguish the first game space associated with the first online game from the second game space associated with the second online game. By way of non-limiting example, the first online game may be an online game in which players play kingdom lords in the first game space that simulates a medieval world; and the second online game may be an online game in which players play future characters within the second game space that simulates a future world. In that example, the first online game may be separate and discrete from the second online game such that players of the first online game may not interact with the second game space from the first online game (e.g., through a game space interface of the first online game); and the players of the second online game may not interact with the first game space from the second online game. As described above, this may involve, but not limited to, facilitating different game space interfaces for player interaction with the first online and second online games (e.g., a dedicated game space interface for the first online game and a dedicated game space interface for the second online game), maintaining separate state information corresponding to the first and second game spaces, maintaining separate player accounts associated with the first and second online games, providing different gameplays, characters, simulations, topography, and/or any other elements in first online game than in the second online game, and/or any other operations for operating the first and second online games separately and independently.

Players may participate in both the first game space associated with the first online game and the second game space associated with the second online game. Players participating in the first game space and second game space may control different characters in the respective games (e.g., characters from the first online game may not be present in the second online game, and vice versa), may be associated with different realms they are building in the different games (e.g., realms present in the first online game may not be present in the second online game, and vice versa), may have separate player inventories of virtual items and/or currency that are not transferable between the first and second online games, may be members of separate alliances in the different games, and/or may the games may be separate and discrete in other ways. Progress and/or gameplay by a player in the first online game may typically have no impact on progress and/or gameplay by the player in the second online game. The first online game and the second online game may be associated with different internet locations (e.g., URLs or IP Addresses), may have different game genres, may require access through different platforms (e.g., the first online game may be a mobile game and the second online game may be accessed through a website from a desktop computer). However, within the first and second online games, multigame currencies may be used to facilitate player participation in both first and second online games. That is, the multigame currencies described herein may be used in the first online and as well as in the second online game.

In some examples, the first and second online games may be developed and/or hosted by the same provider(s). In those examples, an interface may be implemented on a client computing platform 104 enabling a player to select which online game to participate in. For example, an icon representing the first online game and an icon representing the second online game may be presented in the interface side by side for the player to select which online game to participate in. In some other examples, the first and second online games may be accessed through webpages over the Internet such that players may be logged into the first or second online games through the webpages. Other examples of accessing first and second online games are contemplated.

The player account component 116 may be configured to manage player accounts for the individual players of the first and second online games. The player accounts may comprise one or more player profiles and/or player information stored by server 102, one or more of the client computing platforms 104, and/or other storage locations. The player information may include for example, information identifying players in system 100 (e.g., a username or handle, a number, an identifier, and/or other identifying information) within the virtual space, security login information in system 100 (e.g., a login code or password), subscription information, currency information (e.g., related to currency held in credit for a player), relationship information (e.g., information related to relationships between players in the virtual space), system usage information, demographic information associated with players, interaction history among players in the virtual space, information stated by players, purchase information of players, browsing history of players, a client computing platform identification associated with a player, a phone number associated with a player, and/or other information related to players.

Figure 2:
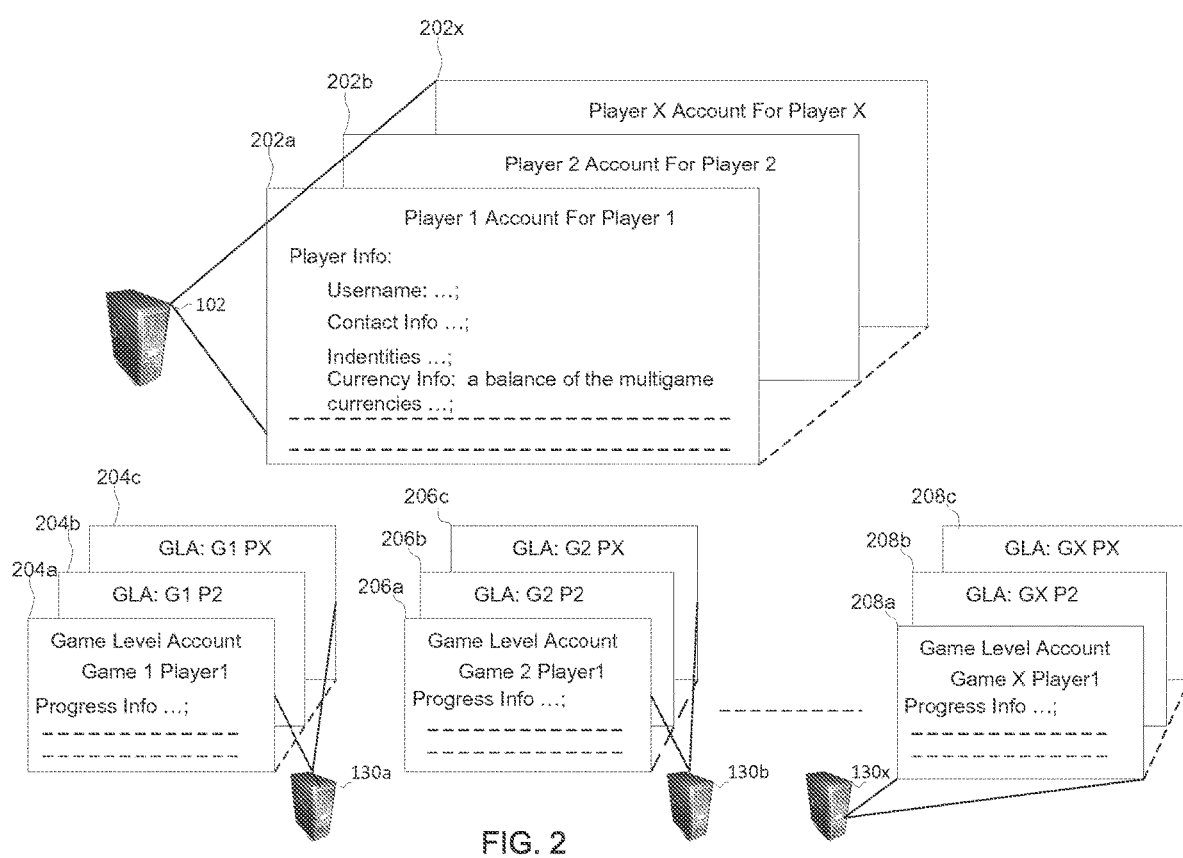
FIG. 2 illustrates progress information may be included in the player game level accounts managed for the players.

By way of illustration, FIG. 2 shows one example of player accounts 202 managed by the server 102, for example via the player account component 116. As shown, individual player accounts 202a, 202b, and 202x may be managed for individual players in the system 100. As shown, for example, the player account 202a for player 1 may include player information regarding player 1, such as the name, contact information, identities, currency information regarding player 1 in system 100.

The identity information in the player account 202a may indicate a real-world identity of the player 1, such as a real-world name specified by player 1. The identity information in the player account 202a may indicate one or more third party identities that have been associated with player 1 for various online games. The third party identities may include one or more of a social media identity, an electronic mail system identity, an identity in a third party web system, an identity provided by a telecommunication service provider, and/or any other identities facilitated by a third party affiliated with system 100. By way of non-limiting example, a first social media identity such as a Facebook™ ID may be associated with player 1 for the first online game, a second social media identity such as a Google+™ ID may be associated with player 1 for the second online game, a first email address (e.g., Google, Yahoo, Hotmail, Sina, ATT-.NET or any other email addresses) may be associated with player 1 for the third online game, and/or any other third party identities associated with player 1 for any other online games. As will be described further in detail, the associations of the third party identities with the players for the online games may be used to authenticate requests to use multigame currencies in the online games.

The currency information in the player account 202a may indicate a balance of multigame currencies available for player 1 to use across the online games in system 100 such as the first online game and the second online game. Examples of the multigame currencies useable across the online games may include points, credits, gold, gem, silver, coins, tokens, and/or any other virtual currencies deemed as multigame currencies by the provider of system 100. The multigame currencies in the player accounts may be consumed by the players across the online games to facilitate the player participation in the in the online games. Much like currencies specific to an online game, the multigame currencies may be used to fund in-game activities (e.g., to construct buildings, to speedup upgrades, to recruit heroes or troops, and/or any other in-game activities), to purchase virtual items in the online games, to facilitate transactions between the players in the online games, and/or for any other purposes in the online games. In this sense, the multigame currencies are much like "universal" currencies usable across the online games. For example, without limitation, the multigame currencies may be used in the first online game to acquire a weapon and/or any other virtual items, may be used in the second online game to participate in a quest (e.g., the quest may have an entrance fee), and/or may be used in any other online games in system 100 to facilitate player participation in those online games.

Returning to FIG. 1, first game level component 118a may be configured to manage player game level accounts for the players of the first online game. The player game level accounts managed by the first game level component 118a may comprise progress information indicating player progress in the first online game. Progress made by a given player in the first online game may reflect levels, status achieved, rank reached, events participated in, activities performed, actions performed, winnings achieved, losses incurred, purchases made, social interaction with other players made, play time logged, play sessions logged, and/or any other types of progress made by the given player in the first online game.

In some examples, the progress information may include information indicating historical purchase(s), purchases within one or more time periods, current balance, stored balance, and/or any other types of statistics regarding balances or purchases of virtual items, and/or any other elements in the first online game related to the given player. In some examples, the progress made by the given player in the first online game may reflect one or more in-game events encountered, awards received, statuses reached, records acquired, and/or any other types of statistics regarding play by the given player in the first online game. In some examples, the progress information may indicate progress made by the given player in the first online game by conveying one or more level attributes associated with the given player.

In some examples, the progress information may indicate progress made by the given player in the first online game by reflecting a number of friends connected and/or invited by the given player in the first online game, a number of virtual gifts given to other players or friends in the first online game, a number of virtual gifts received by the given player from other players in the first online game, and/or any other statistics related to social activities engaged in by the given player in the first online game. In some implementations, the given player's progress in an event, such as progress in a tournament or another promotional event provided in the first online game, may be captured and managed through the progress information included in the player game level account for the given player.

In some examples, the progress information may indicate an amount of play time played the first online game by the given player in a time period. For example, without limitation, the progress information may indicate that the given player has played the first online game for 100 hours in the last month, 25 hours in the past 10 days, 6 hours in the past 24 hours, and so on. In some examples, the progress information may indicate a quantity of play sessions logged by the given in the first online game in a time period. For example, without limitation, the progress information may indicate the given player has logged 10 play sessions in the last week, 30 play sessions in the last month, 100 play session in the last 3 months and/or any other number of play sessions in any time period. In some examples, the progress information may reflect a frequency of playing the first game by the given player in the time period. For example, without limitation, it may indicate that the given player has played the first online game every day in the last month, every other day in the last 2 month, at least 3 times a week in the last 3 month, or any other frequencies.

The second game level component 118b may be configured to perform the same or substantially similar functionalities as/to those provided by first game level component 118a. The player game level accounts managed by the second game level component 118b may comprise progress information indicating progresses by the individual players in the second online game. The type(s) of progress information in the second online game by a given player may be the same as or substantially similar to those in the player level game account for the given player managed by the first game level component 118a.

FIG. 2 illustrates progress information may be included in the player game level accounts 204 managed for the players. As shown, a set of player game level accounts 204 may be managed for the players for participation in the first online game, a set of player game level accounts 206 may be managed for the players for participation in the second online game, a set of play game level accounts 208 may be managed for the players for participation in the second online game, and/or any other set of player game level accounts may be managed for the players for participation in any other online game in system 100.

Returning to FIG. 1, the game communication component 120 may be configured to receive, obtain, and/or transmit information related to first online game, the second online game, and other online games (if any) from and/or to the respective online games. The information received and/or obtained by the game communication component 120 may include progress information in the player game level accounts managed by the game level components, such as first game level component 118a and second game level component 118b. As will be described further in detail, the progress information received and/or obtained from the online games may be used by the currency information update component 122 to intermittently update the currency information in the player accounts managed by the player account component 116. The information received and/or obtained by the game communication component 120 may include requests to use, in the online game, multigame currencies in the player accounts. As will be described further in detail, such requests may be forwarded to server 102 by servers 130 so that the currency information (e.g., debit the balance of the multigame currencies in the player account) in the player accounts may be updated. In some examples, the request received and/or obtained by the currency information update component 122 may include indication whether the request has been authorized by the authentication component 126, such as the first authentication component 126a or the second authentication component 126b.

The currency information update component 122 may be configured to intermittently update currency information in the player accounts based on the progress information in the player game level accounts for the players. The intermittent updates of the currency information by the currency information update component 122 may include increasing the balance of the multigame currencies in the player accounts based on certain progresses made by the players in the online games, decreasing the balance of the multigame currencies in the player accounts according to requests to use multigame currencies in the online games, and/or any other operations. The frequency of the updates by the currency information update component 122 may be configured in a number of ways. In one implementation, the updates of the currency information updates may be schedule-based such that the updates may take place at a predetermined cadence. By way of non-limiting example, such a cadence may be once every 5 minutes, every hour, every 12 hours, every 24 hours or any other cadence. For instance, the currency updates for the player accounts of the individual online games including the first and second online games may take place once every 24 hours such that the progress information in the player game level accounts for the 24 hours may be evaluated. In another implementation, the updates of the currency information may be event driven such that player events in the online games as reflected by the play progress information may be monitored, and in response to one or more player events, the update may be triggered by the currency information update component 122 accordingly. By way of non-limiting example, certain player events in the online games such as certain amount of play time logged, certain level achieved and/or any other player events in the online games may be monitored by the currency information update component 122. In that example, response to occurrence of those player events in the online games, the currency information update component 122 may be configured to update the multigame currencies in corresponding player accounts.

In some implementations, the currency information update component 122 may be configured to evaluate progresses made by the given player in an online game and determine a value for increasing the balance of the multigame currencies in the player account associated with the given player. In implementations, progress metrics may be used to measure player progress for determining corresponding multigame currency increases (or decrease) in the player accounts. For example, without limitation, an progress metric may be used to evaluate play time for which a given online game is played by a given player such that if the actual playtime logged by the given player in the given online game breaches a threshold value, a corresponding quantity of multigame currencies may be awarded to the given player.

In some implementations, formulas may be used to evaluate player progresses in the online games for determining corresponding multigame currency increases (or decrease) in the player accounts. For example, without limitation, a formula #1 may be specified for progress metric #1 and a formula #2 may be specified for progress metric #2. The formulas may indicate how a multigame currency update value may be determined for a player as a function of the changes in player progress a given online game.

By way of non-limiting example, the provider(s) of the online games may desire the players to undertake military actions in the first and second online games during a certain period, for example on a given Sunday. In that example, a factor of 2 may be specified by the provider(s) of the online games, e.g., through the formulas, such that the changes values of military power by the players (i.e., the player progress) in the first online game and second online game on the given Sunday will be counted as double. An exemplary formula including such a factor is illustrated below:

Quantity of Multigame Currency Awarded=(Change in Military Power in the first or second game on the given Sunday)×2+(Change in Military Power in the first or second game on any other days)×1

In this way, the players of the online games may be incentivized to undertake military actions on the given Sunday.

Figure 3:
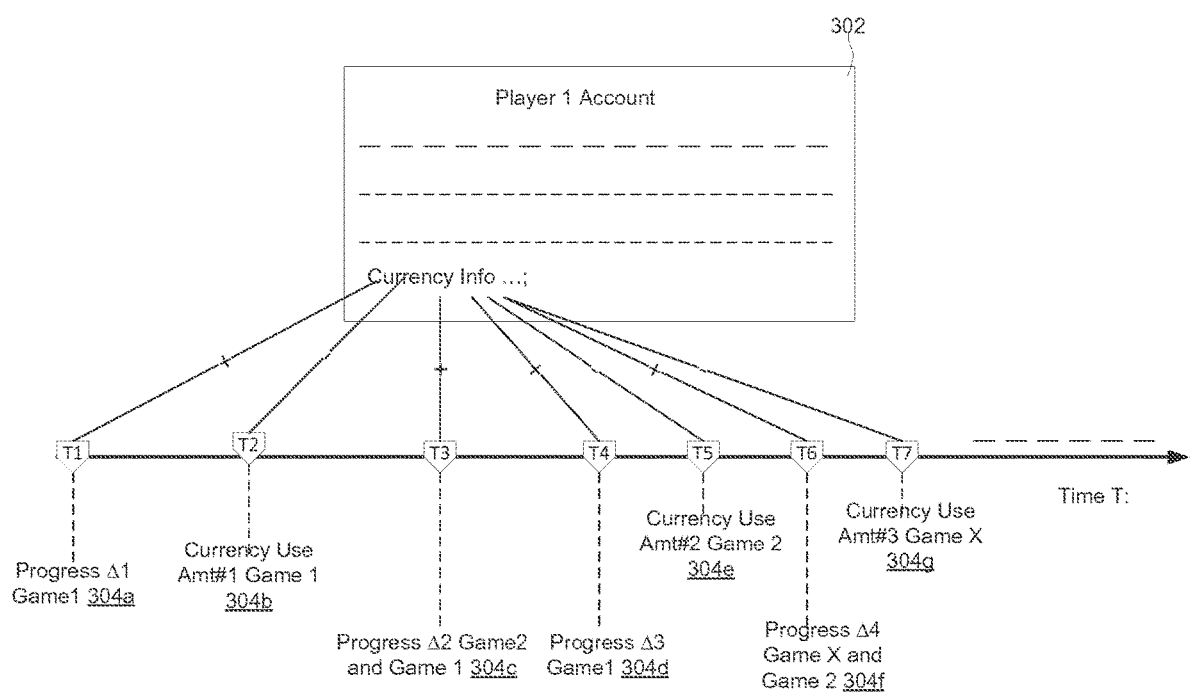
FIG. 3 illustrates updating currency information in a player account in accordance with the disclosure.

FIG. 3 illustrates updating currency information in a player account based on player progress and activities in the individual online games in accordance with the disclosure. As illustrated in FIG. 3, a given player, for example such as player number shown 1 shown in this example, may engage in various activities in the individual online games in system 100. This illustrated by various activities or player events by the given player that take place in the respective online games along a time line T. As shown, the given player may, at time T1, make a progress 304a in the first online game. As described above, the progress 304a may be reflected from the progress information in the player game level account managed by a game level account for the first online game. As also described above, the progress information may be transmitted to server 102, for example via the game communication component 120. The progress 304a in this example may be obtained from the progress information and evaluated by server 102, for example via the currency information update component 122. Based on the evaluation, the currency information in the player account 302 may be updated—i.e., the balance of the multigame currencies in the player account may be increased based on the progress 304a made by the given player in the first online game.

As also shown in this example, the update of the currency information may include decreasing the balance of the multigame currencies in the player account, for example in response to a currency use request 304b made by the given player. As illustration, the currency use request 304b indicates the given player requests to use 50 units of the multigame currencies in the given player account in the first online game. The server 102 may deduct the balance of the multigame currencies in the given player account by 50 units to register the currency use request in the first online game.

As still illustrated, the player progresses and the currency use requests based on which the currency information in the given player account 302 may be updated may be from different online games. In this way, the multigame currencies may be "spent" and "earned" across the multiple online games. It should be appreciated that the currency information update in the given player account is not only limited to player progress in a single online game. As illustrated by progress 304c and 304f, a single update of the currency information may be based on player progresses in multiple games.

Returning to FIG. 1, the first request component 124a may be configured to receive requests from requesters. The requests received by the first request component 124a may include a request to use multigame currencies in the player accounts in the first online game. Such a request may specify a quantity of the multigame currencies to be used in the first online game, identification of a player account from which the requested multigame currencies may be debited, and/or any other information. By way of non-limiting example, a player may request to use 50 units of the multigame currencies in the first online game, for example, to purchase a virtual item in the first online game. In that example, a request to use the 50 units of the multigame currencies in the first online game may be received, e.g., from a virtual store interface that facilitates players to purchase virtual items. In some implementations, the first request component 124a may be configured to effectuate transmission of such a request to server 102, for example via the game communication component 120 so that the currency information in the player account may be updated to reflect the use of the multigame currencies in the first online game as described above. This is illustrated in FIGS. 4-5.

In some implementations, the requests received by the first request component 124a may include requests to remove association of third party identity and player for the online games. By way of non-limiting example, a request may be received by the first request component 124a to remove a third party identity associated with a given player for the first online game. This is illustrated in FIG. 6.

The second request component 124b may be configured to provide the same or similar functionality with respect to first request component 124a. That is, the second request component 124b may be configured to receive requests, effectuate a transmission of the request to server 102 so that the currency information in the player account may be updated to reflect the use of the multigame currencies in the second online game.

The first authentication component 126a may be configured to authenticate requests to use currencies in the first online game as received by the first request component 124a. This may involve challenging the requester to provide values for a username/password combination that has been associated with a player. By way of non-limiting example, a given request may request to use 50 units of multigame currencies in a given player account for purchase of a virtual item in a virtual store in the first online game. In that example, the first authentication component 126a may be configured to authenticate the given request such that the requester is challenged to demonstrate he/she is indeed the given player before an authorization to use the requested multigame currencies may be granted. As described above, such authentication by the first authentication component 126a may be performed through a third party identity associated with the given player for the first online game. For example, the given player may have associated a third party identity with him/herself for the first online game, and the authentication by the first authentication component 126a may be performed through the third party identity. In this way, the security of the multigame currencies may be protected through the third party identity, which may provide stronger protection than that provided by the username/password combination used for the first online game.

By way of illustration, a given player may have associated a Facebook identity with him/herself for the first online game, and this association may be recorded in the given player account managed by the player account component 116 as described above. A request to use the multigame currencies in the given player account may be authenticated using this Facebook identity. That is, the requester may be challenged to provide a password associated with the Facebook identity before the request is authorized. In implementations, the password value provided by the requester may be forwarded to a third party server for authentication (e.g., an authentication server that can authenticate a Facebook identity/password combination). In response to a successful authentication, the request to use the multigame currencies may be authorized, and as described above the authorized request may be forwarded to server 102, for example via the game communication component 120 so that currency information in the given player account may be updated to reflect the transaction.

Figure 4A:
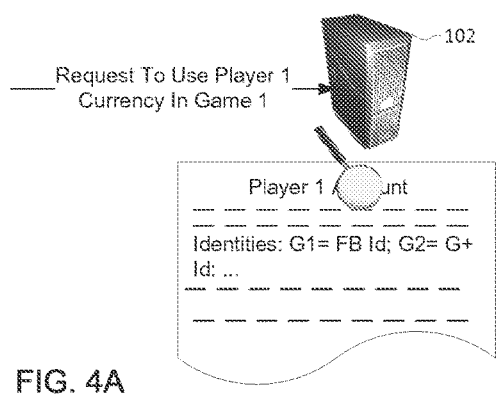
FIG. 4A illustrates a request to use multigame currencies in a given player account is received when there exists a third party associated with the given player.
Figure 4B:
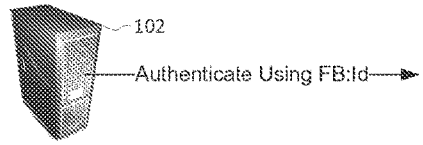
FIG. 4B illustrates authenticating the request illustrated in FIG. 4A in accordance with the disclosure.

FIGS. 4A-4B illustrate authenticating a request to use multigame currencies in a given player account in accordance with the disclosure. As shown in FIG. 4A, a request to use multigame currencies in the first online game may be received by server 102, e.g., via first request component 124a. As illustrated, the request may indicate the requested multigame currencies may be debited from player 1's account. As shown in FIG. 4B, in response to such a request, server 102 may authenticate the request using a third party identity associated with player 1 for the first online game. As shown in this example, the association of third party identity for the first online game may be determined through the player 1's account managed by the player account component 116.

Returning to FIG. 1, in certain situations, a third party identity may not have been associated with the given player for the first online game, when a request to use the multigame currencies in the given player account in the first online game is received by the first request component 124a. To address such situations, the first authentication component 126a may be configured to search for a third party identity that has been associated with the given player for another online game. In the case where, one or more of such a third party identity exist, the first authentication component 126a may be configured to use one of the one or more third party identities to authenticate the request, and upon a successful authentication, the first authentication component 126a may be configured to facilitate the player to associate a third party identity with him/herself for the first online game.

Figure 5A:
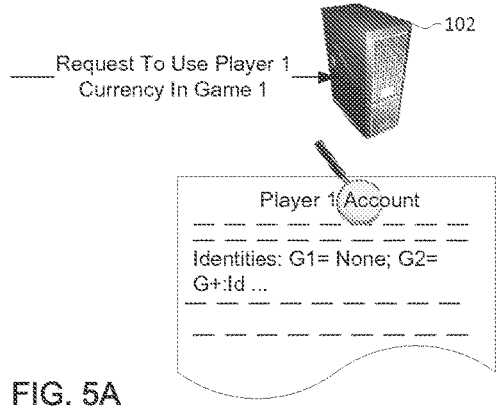
FIG. 5A illustrate a request to use multigame currencies in a given player account is received when there does not exist a third party associated with the given player.
Figure 5B:
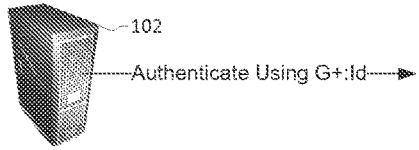
FIG. 5B illustrates authenticating the request illustrated in FIG. 5A in accordance with the disclosure.

FIGS. 5A-5B illustrate authenticating a request to use multigame currencies in a given player account in a given online game when no third party identity has been associated with the given player for the given online game. As shown in FIG. 5A, a request to use multigame currencies in the first online game may be received by server 102, e.g., via first request component 124a. In contrast to the situation illustrated in FIG. 4A, there does not exist a third party identity associated with the player 1 for the first online game. However, as illustrated, there exists a third party identifier associated with player 1 for the second online game, e.g., a Google+ID. As illustrated in FIG. 4B, the server 102 may authenticate the request in this situation using the Google+ ID associated with the player 1.

Returning to FIG. 1, in some situations, there may not exist any third party identity associated with the given player for anyone of the online games. To address these situations, the first authentication component 126a may be configured to facilitate a requester to associate a third party identity with the given player for the first online game in response to a request to use multigame currencies in the given player account in the first online game.

Figure 6A:
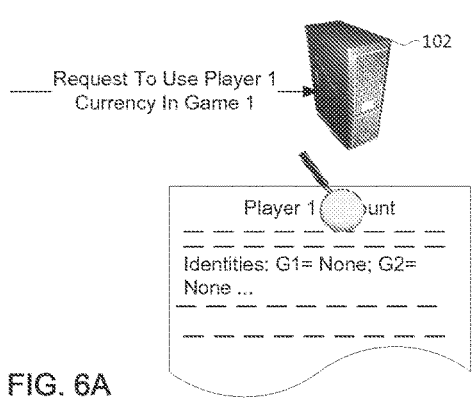
FIG. 6A illustrate a request to use multigame currencies in a given player account is received when there does not exist any third party associated with the given player in any one of the multiple online games.
Figure 6B:
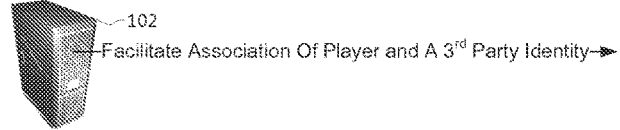
FIG. 6B illustrates authenticating the request illustrated in FIG. 5A in accordance with the disclosure.

FIGS. 6A-6B illustrate authenticating a request to use multigame currencies in a given player account in a given online game when no third party identity has been associated with the given player in any one of the online games in system 100. As shown in FIG. 6A, a request to use multigame currencies in the first online game may be received by server 102, e.g., via first request component 124a. In contrast to the situation illustrated in FIG. 5A, there does not exist any third party identity associated with the player 1 in anyone of the online games in system 100. As illustrated in FIG. 4B, the server 102, in this situation, may facilitate the requester to associate a third party identifier with the given player for the first online game. For example, the requester may be directed to a user interface through which the requester may provide a third party identity for association with the given player. As described above, the third party identity may be used by the first authentication component 126a to authenticate subsequent requests to use multigame currencies in the given player account in the first online game.

In some implementations, the first authentication component 126a may be configured to authenticate requests to remove associations of players and third parity identities for the first online game. Similar to the authentication of request to use multigame currencies, authentication of the requests to remove third party identity and player associations by the first authentication component 126a may be performed through the third party identities to be removed. For example, the given player may have associated a third party identity with him/herself for the online game, and the authentication by the first authentication component 126a may be performed through the third party identity. In this way, the security of the multigame currencies may be protected through the third party identity, which may provide stronger protection than that provided by the username/password combination used for the online game.

Figure 7A:
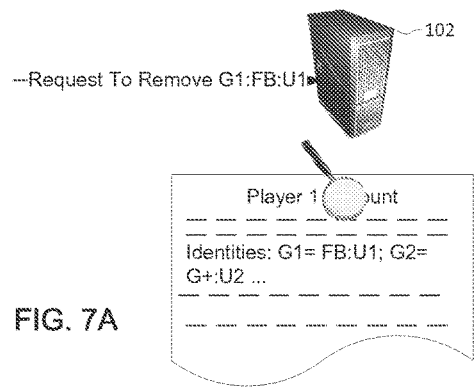
FIG. 7A illustrates a request to remove an association of a third party identity and a given player in the first online game is received.
Figure 7B:
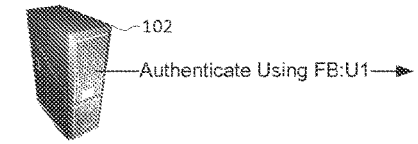
FIG. 7B illustrates authenticating the request illustrated in FIG. 7B in accordance with the disclosure.

FIGS. 7A-7B illustrate authenticating a request to remove an association of a third party identity and a given player in the first online game in accordance with the disclosure. As shown in FIG. 4A, a request to remove an association of a third party identifier and a given player may be received by server 102, e.g., via the first request component 124a. As illustrated, the request may indicate the requested multigame currencies may be debited from player 1's account. As shown in FIG. 4B, in response to such a request, server 102 may authenticate the request using the third party identity to be removed.

In some examples, the first authentication component 126a may be configured to effectuate merge of two player accounts managed by the player account component. In those examples, the first authentication component may be configured to determine multigame currency spending history associated with a particular third part identity of a give player, and determine if such history reflect another player account that has been "drawing" and/or acquiring (e.g., through "earning" or "purchasing") the multigame currency using that particular third party identity. In response to a determination that another player has been "drawing" or acquiring the multigame currency using that particular third party identity, the first or second authentication component may be configured to effectuate the merge of the two player accounts.

By way of non-limiting example, the first authentication component 126a may be configured to determine if a third party identity associated with a first player has had a history of spending multigame currencies via a player account that is not associated with the first player, e.g., a player account associated with a second player. For instance, as illustration, in response to the first player's (the first player is associated with the first player account) request to use multigame currencies in the first player account in a given online game using a Facebook identity (e.g., "John Smith"), the first authentication component 126a may determine that that Facebook identity (e.g., John Smith) has been used by a second player (associated with a second player account) previously for authentication of requests to use multigame currencies in the second player account. In that instance, the first authentication component 126a may be configured to effectuate the merge of the first and second player accounts.

The second authentication component 126b may be configured the same and/or substantially similar to the first authentication component 126a. That is, the second authentication component 126b may be configured to authenticate requests to use multigame currencies in the second online game, requests to remove associations of third party identities and players for the second online, and/or any other requests in ways the same as or substantially similar to those described above for first authentication component 126a.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program components. The computer program components may be configured to enable an expert or player associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts, and/or providers of virtual environments outside of system 100, external entities participating with system 100, and/or other resources. In some implementations, some or all of the functionality attributed herein to external resources 106 may be provided by resources included in system 100.

The servers 102, 130 may include electronic storage 110, one or more processors 108, and/or other components. The servers 102, 130 may include communication lines, or ports to enable the exchange of information with a network and/or other computing platforms. Illustration of server 102 in FIG. 1 is not intended to be limiting. The servers 102, 130 may include a plurality of hardware, software, and/or firmware components operating together to provide the functionality attributed herein to server 102. For example, servers 102, 130 may be implemented by a cloud of computing platforms operating together as servers 102, 130.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processors 108 are configured to provide information-processing capabilities in servers 102, 130. As such, processors 108 may include one or more of a digital processor, an analog processor, a digital circuit designed to process information, an analog circuit designed to process information, a state machine, and/or other mechanisms for electronically processing information. Although processors 108 are shown in FIG. 1 as single entities, this is for illustrative purposes only. In some implementations, processors 108 may include a plurality of processing units. These processing units may be physically located within the same device, or processors 108 may represent processing functionality of a plurality of devices operating in coordination. The processors 108 may be configured to execute components 112, 114, 116, 118*a*, 118*b*, 120, 122, 124*a*, 124*b*, 126*a*, and 126*b*. Processor 108 may be configured to execute components 112, 114, 116, 118*a*, 118*b*, 120, 122, 124*a*, 124*b*, 126*a*, and 126*b* by software; hardware; firmware; some combination of software, hardware, and/or firmware; and/or other mechanisms for configuring processing capabilities on processor 108.

It should be appreciated that although components 112, 114, 116, 118*a*, 118*b*, 120, 122, 124*a*, 124*b*, 126*a*, and 126*b* are illustrated in FIG. 1 as being co-located within single processing units, in implementations in which processor 108 includes multiple processing units, one or more of components 112, 114, 116, 118*a*, 118*b*, 120, 122, 124*a*, 124*b*, 126*a*, and 126*b* may be located remotely from the other components shown as co-locating with 112, 114, 116, 118*a*, 118*b*, 120, 122, 124*a*, 124*b*, 126*a*, and 126*b* in FIG. 1. The description of the functionality provided by the different components 112, 114, 116, 118*a*, 118*b*, 120, 122, 124*a*, 124*b*, 126*a*, and 126*b* described herein is for illustrative purposes, and is not intended to be limiting, as any of components 112, 114, 116, 118*a*, 118*b*, 120, 122, 124*a*, 124*b*, 126*a*, and 126*b* may provide more or less functionality than is described. For example, one or more of components 112, 114, 116, 118*a*, 118*b*, 120, 122, 124*a*, 124*b*, 126*a*, and 126*b* may be eliminated, and some or all of its functionality may be provided by other ones of components 112, 114, 116, 118*a*, 118*b*, 120, 122, 124*a*, 124*b*, 126*a*, and 126*b*. As another example, processor 108 may be configured to execute one or more additional components that may perform some or all of the functionality attributed below to one of components 112, 114, 116, 118*a*, 118*b*, 120, 122, 124*a*, 124*b*, 126*a*, and 126*b*.

Figure 8:
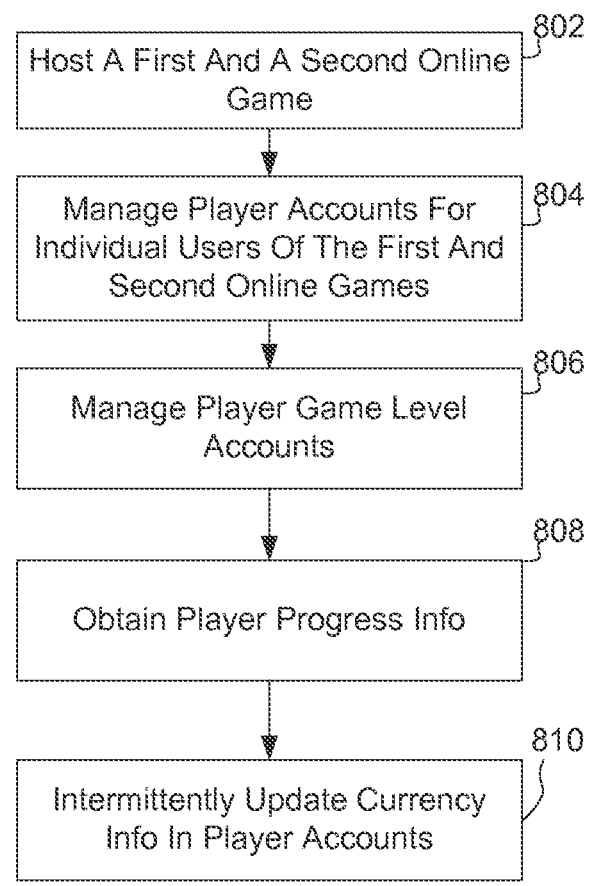
FIG. 8 illustrates one exemplary method for facilitating multigame currencies in online games and security therewith in accordance with the disclosure.

FIG. 8 illustrates one exemplary method 800 for facilitating multigame currencies in accordance with the disclosure. The operations of method 800 presented below are intended to be illustrative. In some embodiments, method 800 may be accomplished with one or more additional operations not described, and/or without one or more of the operations discussed. Additionally, the order in which the operations of method 800 illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, a first online game and a second online game may be hosted. The first online game may be associated with a first game space in which gameplays may be facilitated for players of the first online game. Within the first game space, players may control one or more of an element in the first game space. The second game component may be configured with functionalities described above for first game component. A second game space may be associated with the second online game. The second game space may facilitate gameplays similar to or different from those provided in the first game space. The second online game may be separate and discrete from the first online game such that players of the first online game may not interact with the second game space from the first online game. Within the first game space and second game space, the players may use multigame currencies in performing various game activities. In some implementations, operation 802 may be performed by a first game component and a second game component the same as or similar to first game component 112 and second game component 114 (shown in FIG. 1 and described herein).

At an operation 804, player accounts associated with the players of the first and second online games may be managed. The player accounts managed in operation 804 may include player information and/or player profiles. The player and/or the player profiles may include player identifying information, demographical information, time zone, and/or any other types of profile information related to the individual players. The player identifying information may include information indicating a third party identity associated with the player for a given online game. For example, for given player, the player identifying information may include information indicating a first social media (e.g., Facebook) identity is associated with the given player for the first online game, and information indicating a second social media (e.g., Google+) identity is associated with the given player for the second online game. The player accounts may comprise currency information indicating a balance of the multigame currencies available for the players to use across the first online game, the second online game and other online games (if any). In some implementations, operation 804 may be performed by one or more player components the same as or similar to player component 116 (shown in FIG. 1 and described herein).

At an operation 806, player game level accounts may be managed for the players. The player game level accounts managed in operations may include player game level accounts managed for the first online game, player game level accounts managed for the second online game and/or player game level accounts managed for other online game (if any). A given player game level account managed in operation 896 may comprise progress information indicating player progress in a given online game, e.g., the first or the second online game. The progress information may include certain amount of play time played by the player in the first online game within a time period, certain milestones, gameplay status, social status reached by the player in the first online game, certain number of play sessions logged by the player in the given online game during a time period, certain events completed by the player in the given online game and/or any other progress by the player in the given online game. In some implementations, operations 806 a first game level component the same as or similar to first game level component 118*a* (shown in FIG. 1 and described herein).

At an operation 808, player progress information may be obtained for the players from the player game level accounts managed in operation 806. In some implementations, operation 808 may be performed by a game communication component the same as or similar to game communication component 120 (shown in FIG. 1 and described herein).

At an operation 810, currency information in the player accounts managed in operation 802 may be intermittently updated. The intermittent updates of the currency information in operation 810 may include increasing the multigame currencies in the player account based on certain progress made by the player in a given online game, decreasing the multigame currencies in the player accounts according to requests to use multigame currencies in the online games, and/or any other operations. In some implementation, operation 810 may involve evaluating player progress for determining currency update value. In some implementations, operation 810 may be performed by currency information update component the same as or similar to currency information update component 122 (shown in FIG. 1 and described herein).

Figure 9:
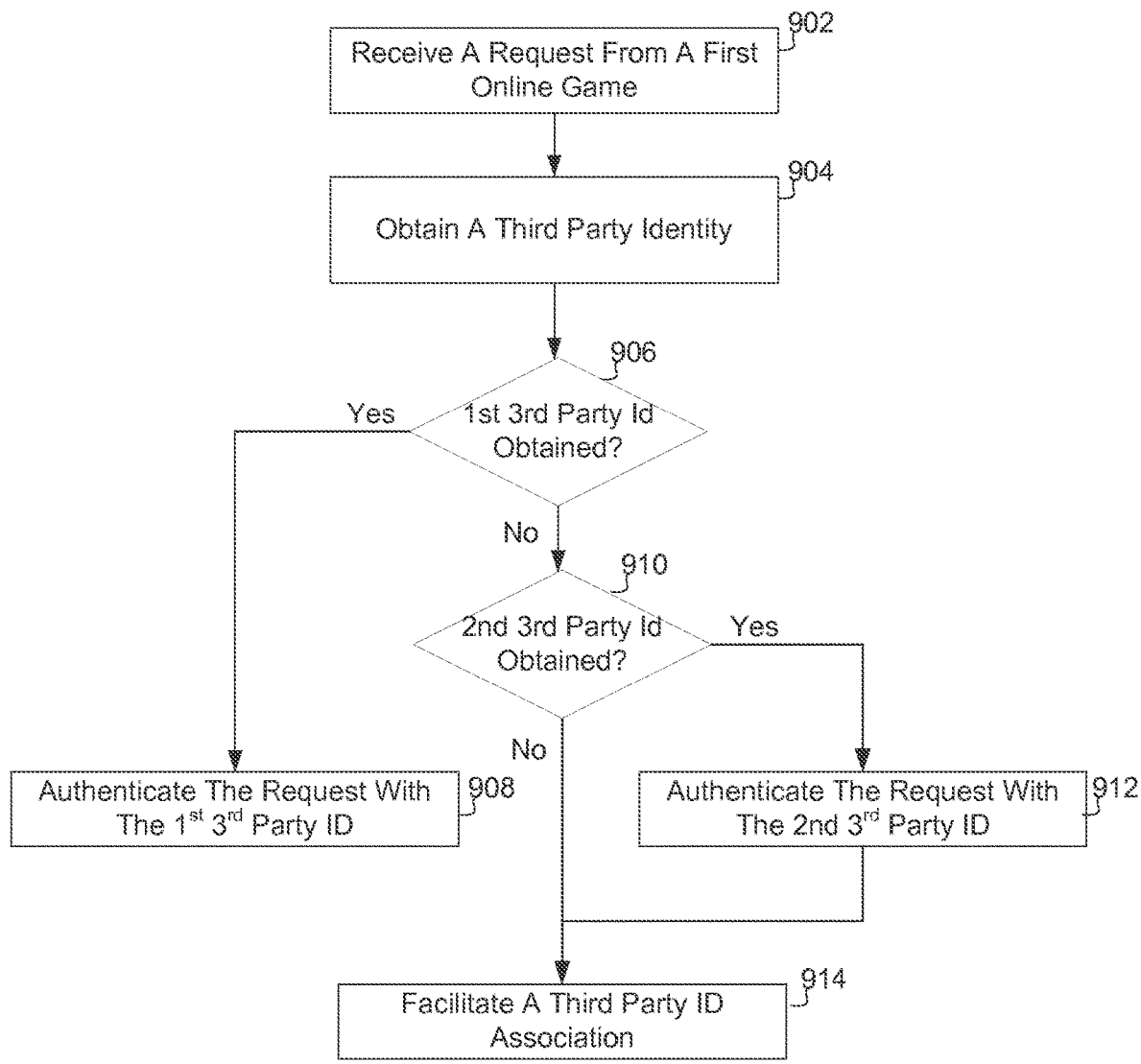
FIG. 9 illustrates one exemplary method 900 for facilitating security for using multigame currencies in multiple online games in accordance with the disclosure.

FIG. 9 illustrates one exemplary method 900 for facilitating security for using multigame currencies in multiple online games in accordance with the disclosure. The operations of method 900 presented below are intended to be illustrative. In some embodiments, method 900 may be accomplished with one or more additional operations not described, and/or without one or more of the operations discussed. Additionally, the order in which the operations of method 900 illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At an operation 902, a request is received from a first online game. The request received in operation 902 may include a request to use multigame currencies in a given player account in the first online game. The request received in operation 902 may include a request to remove an association of a third party identity and a given player for the first online game. In some implementations, operation 902 may be performed by a first request component the same as or similar to first request component 124a (shown in FIG. 1 and described herein).

At an operation 904, a third party identity associated with the given player for the first online game may be obtained. In some implementations, operation 904 may be performed by first authentication component the same as or similar to first authentication component 126a (shown in FIG. 1 and described herein).

At a decision 906, a determination whether a third party identity is associated with the given player for the first online game is determined. As shown, in cases where it is determined that a third party identity associated with the given player for the first online game exists, the method proceeds to operation 908; and in cases where it is determined that a third party identity associated with the given player for the first online game does not exist, the method proceeds to decision 910. In some implementations, operations 906 may be performed by first authentication component the same as or similar to first authentication component 126a (shown in FIG. 1 and described herein).

At an operation 908, the request received in operation 902 may be authenticated using the third party identity obtained in operation 906. In some implementations, operation 908 may be performed by first authentication component the same as or similar to first authentication component 126a (shown in FIG. 1 and described herein).

At a decision 910, a determination whether a third party identity is associated with the given player for another online game, e.g., a second online game, is determined. As shown, in cases where it is determined that a third party identity associated with the given player for another online game exists, the method proceeds to operation 912; and in cases where it is determined that a third party identity associated with the given player for another online game does not exist, the method proceeds to operation 914. In some implementations, operations 910 may be performed by first authentication component the same as or similar to first authentication component 126a (shown in FIG. 1 and described herein).

At an operation 912, the request received in operation 902 may be authenticated using the third party identity obtained in operation 910. In some implementations, operation 912 may be performed by first authentication component the same as or similar to first authentication component 126a (shown in FIG. 1 and described herein).

At an operation 914, an association of a third party and the given player may be facilitated for the first online game. In some implementations, operation 914 may be performed by first authentication component the same as or similar to first authentication component 126a (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating multigame currencies across multiple online games, the system comprising one or more physical processors configured by machine-readable instructions to:

execute instances of game spaces in which corresponding online games take place, and implement the instances of the game spaces to facilitate player participation in the online games such that players are facilitated to use virtual assets as consideration in the online games, the online games including a first online game and a second online game, wherein the first online game is configured to be accessed by a user through a first type of computing platform, wherein the second online game is configured to be accessed by the user through a second type of computing platform that is different from the first type of computing platform;

manage player accounts for individual ones of the players, the player accounts comprising player information regarding the individual ones of the players, the player information including currency information indicating a balance of the virtual assets available to the individual ones of the players for use as consideration, wherein the player accounts include a first player account comprising player information regarding a first player;

manage player game level accounts for the players to participate in the online games, the player game level accounts comprising progress information indicating the player interaction in the online games, wherein the player game level accounts include a first player game level account comprising progress information indicating the first player interaction in the first online game and a second player game level account comprising progress information indicating the first player interaction in the second online game, wherein the first player game level account is associated with a third party identity of the first player, and the second player game level account is associated with another third party identity of the first player; and intermittently update the currency information in the player accounts based on the progress information in the player game level accounts for the players such that first currency information in the first player account is intermittently updated based on the progress information in the first player game level account and based on the progress information in the second player game level account, wherein a first amount of the virtual assets is obtained by the first player via interaction with the first online game as indicated in the first player game level account, and a second amount of the virtual assets is obtained by the first player via interaction with the second online game as indicated in the second player game level account, such that the first currency information in the first player account is updated to reflect the first amount of the virtual assets and the second amount of the virtual assets.

2. The system of claim 1, wherein the progress information in the first player game level account indicates one or more of play time in the first online game by the first player during a time period, one or more events completed by the first player in the first online game, one or more gameplay statuses reached by the first player in the first online game, one or more play sessions logged by the first player during a time period, and one or more social statuses achieved by the first player in the first online game.

3. The system of claim 1, wherein facilitating the players to use the virtual assets in the online games includes authenticating the players in response to players requests to use the virtual assets such that in response to a request by a requester to use, in the first online game, the virtual assets in the first player account, the request is authenticated to verify the requester of the request is the first player.

4. The system of claim 3, wherein authentication of the request to verify the requester of the request is the first player includes:
facilitating the requester to provide, in the first online game, the third party identity in a third party system; and
in response to a determination that there exists the another third party identity provided by the first player previously,
authenticating the requester through the another third party identity; and
responsive to a successful authentication through the another third party identity, associating the third party identity with the first player such that subsequent requests to use, in the first online game, the virtual assets in the first player account are authenticated through the third party identity.

5. The system of claim 4, wherein the third party system includes a third party social media system, a third party authentication system, a third party electronic mail system, or a third party web system.

6. The system of claim 4, wherein the one or more physical processors are further configured to enable the players to remove previously provided third party identities associated with the players from the online games such that the first player is enabled to remove the third party identity to be associated with the first player.

7. The system of claim 6, wherein removal of the third party identity to be associated with the first player includes:
receiving a removal request from the requester to remove the third party identity to be associated with the first player in the first online game; and
authenticating the requester is the first player through the third party identity.

8. A method for facilitating multigame currencies across multiple online games, the method being implemented one or more physical processors configured to execute computer programs, the method comprising:
executing instances of game spaces in which corresponding online games take place, and implement the instances of the game spaces to facilitate player participation in the online games such that players are facilitated to use virtual assets as consideration in the online games, the online games including a first online game and a second online game, wherein the first online game is configured to be accessed by a user through a first type of computing platform, wherein the second online game is configured to be accessed by the user through a second type of computing platform that is different from the first type of computing platform;
managing player accounts for individual ones of the players, the player accounts comprising player information regarding the individual ones of the players, the player information including currency information indicating a balance of the virtual assets available to the individual ones of the players for use as consideration, wherein the player accounts include a first player account comprising player information regarding a first player;
managing player game level accounts for the players to participate in the online games, the player game level accounts comprising progress information indicating the player interaction in the online games, wherein the player game level accounts include a first player game level account comprising progress information indicating the first player interaction in the first online game and a second player game level account comprising progress information indicating the first player interaction in the second online game, wherein the first player game level account is associated with a third party identity of the first player, and the second player game level account is associated with another third party identity of the first player; and
intermittently updating the currency information in the player accounts based on the progress information in the player game level accounts for the players such that first currency information in the first player account is intermittently updated based on the progress information in the first player game level account and based on the progress information in the second player game level account, wherein a first amount of the virtual assets is obtained by the first player via interaction with the first online game as indicated in the first player game level account, and a second amount of the virtual assets is obtained by the first player via interaction with the second online game as indicated in the second player game level account, such that the first currency information in the first player account is updated to reflect the first amount of the virtual assets and the second amount of the virtual assets.

9. The method of claim 8, wherein the progress information in the first player game level account indicates one or more of play time in the first online game by the first player during a time period, one or more events completed by the first player in the first online game, one or more gameplay statuses reached by the first player in the first online game, one or more play sessions logged by the first player during a time period, and one or more social statuses achieved by the first player in the first online game.

10. The method of claim 8, wherein facilitating the players to use the virtual assets in the online games includes authenticating the players in response to players requests to use the virtual assets such that in response to a request by a requester to use, in the first online game, the virtual assets in the first player account, the request is authenticated to verify the requester of the request is the first player.

11. The method of claim 10, wherein authentication of the request to verify the requester of the request is the first player includes:
facilitating the requester to provide, in the first online game, the third party identity in a third party system; and
in response to a determination that there exists the another third party identity provided by the first player previously,
authenticating the requester through the another third party identity; and
responsive to a successful authentication through the another third party identity, associating the third party identity with the first player such that subsequent requests to use, in the first online game, the virtual assets in the first player account are authenticated through the third party identity.

12. The method of claim 11, wherein the third party system includes a third party social media system, a third party authentication system, a third party electronic mail system, or a third party web system.

13. The method of claim 11, further comprising enabling the players to remove previously provided third party identities associated with the players from the online games such that the first player is enabled to remove the third party identity to be associated with the first player.

14. The method of claim 13, wherein removal of the third party identity to be associated with the first player includes:
receiving a removal request from the requester to remove the third party identity to be associated with the first player in the first online game; and
authenticating the requester is the first player through the third party identity.

\* \* \* \* \*